United States Patent
Jikihara et al.

(10) Patent No.: US 11,235,421 B2
(45) Date of Patent: Feb. 1, 2022

(54) LASER WELDING METHOD AND LASER WELDING DEVICE

(71) Applicant: AMADA HOLDINGS CO., LTD., Kanagawa (JP)

(72) Inventors: Takaaki Jikihara, Kanagawa (JP); Ikuyasu Ono, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 16/612,923

(22) PCT Filed: Apr. 26, 2018

(86) PCT No.: PCT/JP2018/016925
§ 371 (c)(1),
(2) Date: Nov. 12, 2019

(87) PCT Pub. No.: WO2018/211937
PCT Pub. Date: Nov. 22, 2018

(65) Prior Publication Data
US 2020/0198056 A1    Jun. 25, 2020

(30) Foreign Application Priority Data

May 16, 2017 (JP) .............................. JP2017-097228

(51) Int. Cl.
*B23K 26/14* (2014.01)
*B23K 26/21* (2014.01)
*B23K 26/08* (2014.01)

(52) U.S. Cl.
CPC .............. *B23K 26/14* (2013.01); *B23K 26/08* (2013.01); *B23K 26/1464* (2013.01); *B23K 26/21* (2015.10)

(58) Field of Classification Search
CPC .. B23K 26/14; B23K 26/1476; B23K 26/123; B23K 26/147; B23K 26/38;
(Continued)

(56) References Cited

U.S. PATENT DOCUMENTS 4,023,006 A * 5/1977 West .................... B23K 10/006
219/121.46
4,945,207 A    7/1990 Arai
(Continued)

FOREIGN PATENT DOCUMENTS

| CN | 105531073 A | 4/2016 |
| JP | 4-185761 A | 7/1992 |

(Continued)

OTHER PUBLICATIONS

English translation of JP2008068305A (Year: 2008).*
(Continued)

*Primary Examiner* — Ibrahime A Abraham
*Assistant Examiner* — Chris Q Liu
(74) *Attorney, Agent, or Firm* — Greenblum & Bernstein, P.L.C.

(57) ABSTRACT

A laser welding method is constituted of: emitting shield gas in advance through a laser nozzle provided on a laser processing head at a time of moving the laser processing head from a reference position to a starting position for welding the workpiece; and radiating laser light onto the workpiece through the laser nozzle at the starting position for welding when a feeding rate of the shield gas gets stabilized, whereby performing laser welding on the workpiece.

3 Claims, 5 Drawing Sheets

(58) Field of Classification Search
CPC .............. B23K 26/0608; B23K 26/08; B23K 26/0876; B23K 26/12; B23K 26/125; B23K 26/142; B23K 26/1436; B23K 26/1437; B23K 26/1438; B23K 26/1464; B23K 26/0613; B23K 26/0626; B23K 26/064; B23K 26/0648; B23K 26/083; B23K 26/0869; B23K 26/128; B23K 26/21; B23K 26/40; B23K 26/702; B23K 26/00; B23K 26/032; B23K 26/06; B23K 26/0617; B23K 26/0665; B23K 26/073; B23K 26/0734; B23K 26/1423; B23K 26/1435; B23K 26/1494; B23K 26/16; B23K 26/206; B23K 26/24; B23K 26/32; B23K 26/323; B23K 26/348; B23K 26/361; B23K 26/362; B23K 26/364; B23K 26/382; B23K 26/389; B23K 26/703
USPC ............ 219/121.84, 121.64, 121.63, 121.72, 219/121.6, 121.83, 121.85, 74, 121.65, 219/121.67, 121.7, 121.71, 121.82, 219/121.86

See application file for complete search history.

(56) References Cited

U.S. PATENT DOCUMENTS

| | | | | |
|---|---|---|---|---|
| 5,852,276 | A * | 12/1998 | Yamazaki | B23K 26/0853 219/121.62 |
| 6,111,214 | A | 8/2000 | Saito | |
| 6,198,070 | B1 * | 3/2001 | Nakayama | B23K 26/1476 219/121.68 |
| 2007/0051709 | A1 * | 3/2007 | Lambert | B23K 26/142 219/121.84 |
| 2015/0314394 | A1 * | 11/2015 | Mori | G05B 19/4067 219/121.83 |
| 2016/0107259 | A1 * | 4/2016 | Petolillo | B23K 26/206 219/121.63 |

FOREIGN PATENT DOCUMENTS

| | | |
|---|---|---|
| JP | 6-9782 U | 2/1994 |
| JP | 2000-117481 A | 4/2000 |
| JP | 2008-68305 A | 3/2008 |
| JP | 2011-156578 | 8/2011 |
| JP | 2015-196168 A | 11/2015 |
| JP | 2016-93825 A | 5/2016 |

OTHER PUBLICATIONS

China Official Action issued in CN Application No. 201880032148. X, dated Jun. 5, 2020.

International Search Report issued in PCT/JP2018/016925, dated Jul. 17, 2018, along with an English translation thereof.

Decision to Grant a Patent issued in Japan Counterpart Patent Appl. No. 2017-097228, dated Jul. 17, 2018, along with an English translation thereof.

Supplementary European Search Report issued in Appl. No. EP 18 80 1873, dated Apr. 23, 2020.

* cited by examiner

LASER WELDING METHOD AND LASER WELDING DEVICE

TECHNICAL FIELD

The disclosure herein relates to a laser welding device, which is used in a welding robot to enable a laser processing head to be three-dimensionally positioned, and a laser welding method using the same, and in more detail relates to a laser welding device and a laser welding method capable of suppressing consumption of shield gas to be emitted through the laser processing head onto a weld zone.

BACKGROUND ART

In a case where anyone uses a laser welding device such as a welding robot to carry out laser welding on a workpiece for example, it is general to emit assist gas onto a laser weld zone and then carry out the laser welding. The PTL 1 discloses a related art.

CITATION LIST

Patent Literature

PTL 1: Japanese Patent Application Laid-open No. 2016-93825

SUMMARY OF THE INVENTION

FIGS. 2 and 3 in the patent literature illustrate that sectional shapes of beads depend on kinds of shield gas emitted onto weld zones. Further, the PTL 1 describes that sectional shapes of beads at the weld zones would vary when the feeding rate of the shield gas varied, and this would result in poor welds.

Therefore, execution of successful laser welding requires a condition where the feeding rate of the shield gas is stable at the time of laser welding. Thus, by starting emitting shield gas when the laser processing head is position at a reference position (start position for starting moving), it is possible to stabilize the feeding rate of the shield gas at the time of operation of moving the laser processing head to a starting position for welding the workpiece. In this case, when the laser processing head reaches the starting position for welding, the feeding rate of the shield gas is set in a stable condition and therefore the laser welding can be well carried out.

In the aforementioned case, however, even in a case where the feeding rate of the shield gas gets stabilized, the laser processing head is still moving toward the starting position for welding and this gives rise to problems in improving effectiveness of the laser welding and as well suppressing consumption of the shield gas.

The laser welding method is provided with emitting shield gas in advance through a laser nozzle provided on a laser processing head at a time of moving the laser processing head from a reference position to a starting position for welding the workpiece; and radiating a laser beam onto the workpiece through the laser nozzle at the starting position for welding when a feeding rate of the shield gas gets stabilized, thereby performing laser welding on the workpiece.

The laser welding device is provided with a laser processing head being three-dimensionally movable and including a laser nozzle; a shield gas feeding means for feeding shield gas to the laser nozzle; a laser oscillator generating a laser beam to be radiated onto the workpiece through the laser nozzle; and a control device controlling an action of the laser processing head, the shield gas feeding means, and an action of the laser oscillator, the control device including arrival estimation calculation means for referring a travel path and a travel speed of the laser processing head from the reference position to the starting position for welding the workpiece and calculating a travel time of the laser processing head from the reference position to the starting position for welding, a gas feeding rate stability data table storing in advance data of gas feeding rate stability times from starting emitting the shield gas until stabilizing a gas feeding rate and welding conditions, and gas emission point calculation means for referring a result of calculation by the arrival estimation calculation means and the data stored in the gas feeding rate stability data table and calculating a point of time for emitting the shield gas.

Advantageous Effects of Invention

As supply of the shield gas starts at a point of time when the feeding rate of the shield gas gets stabilized just after the laser processing head reaches the starting position for welding the workpiece, it is enabled to suppress wasted consumption of the shield gas. Further, at a time of starting the laser welding, as supply of the shield gas gets stabilized, the laser welding can be well carried out.

DESCRIPTION OF EMBODIMENTS

Exemplary embodiments will be described hereinafter with reference to appended drawings.

Figure 1:
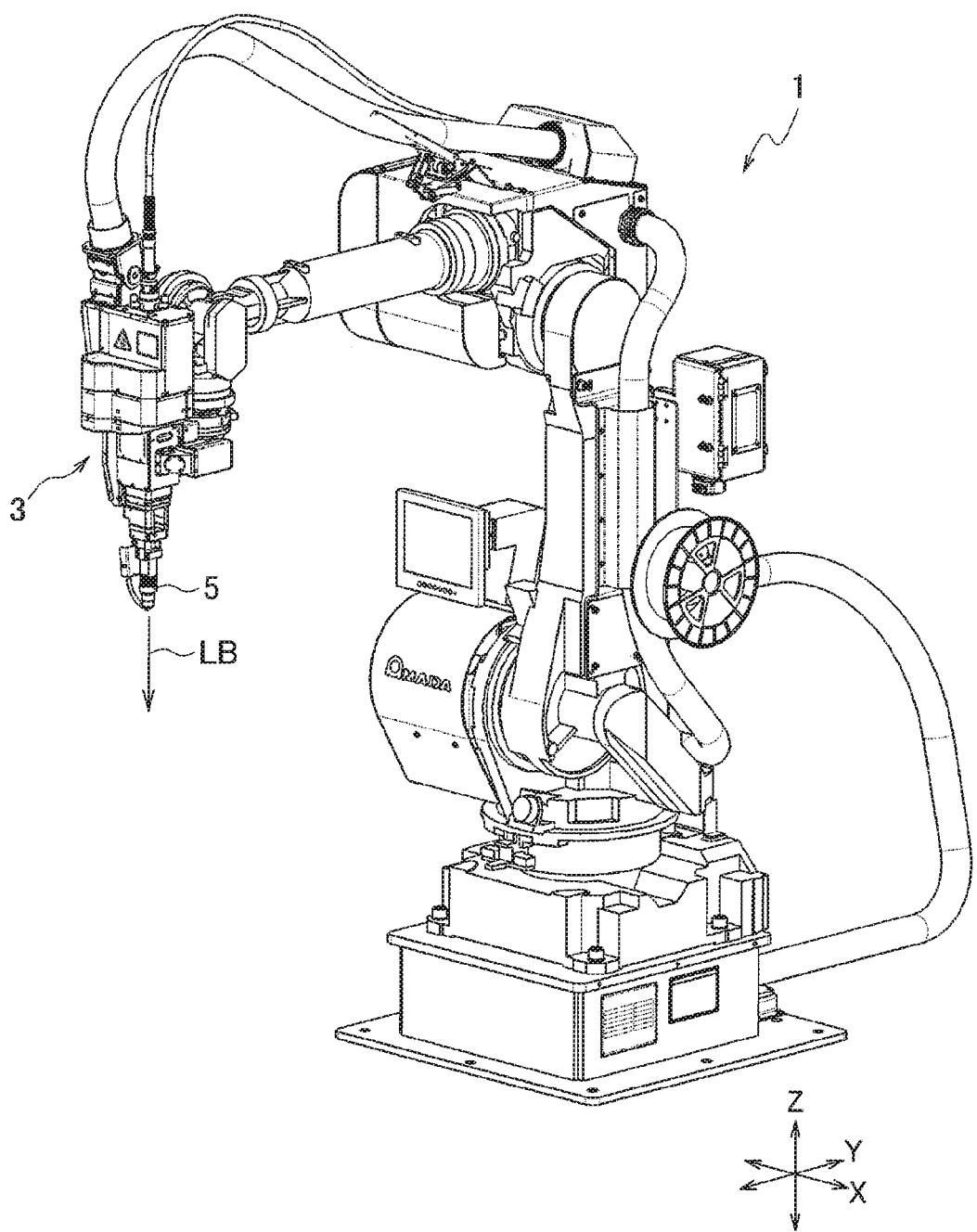
FIG. 1 is a perspective view showing an exterior appearance of a laser welding device.

Referring mainly to FIG. 1, the laser welding device 1 is constituted to have a laser processing head 3 at a fore end section of a robot arm in an industrial robot. On the laser processing head 3 provided is a laser nozzle 5 for radiating a laser beam LB generated by a laser oscillator (not shown) onto a workpiece (not shown). The laser nozzle 5 is so constituted as to emit shield gas fed from a shield gas feeding means (not shown) onto a laser welding portion of the workpiece.

Meanwhile, as the laser welding device 1 as described above has a constitution that has been well-known, descriptions about its detailed constitution and action of the laser welding device 1 will be omitted.

Figure 2:
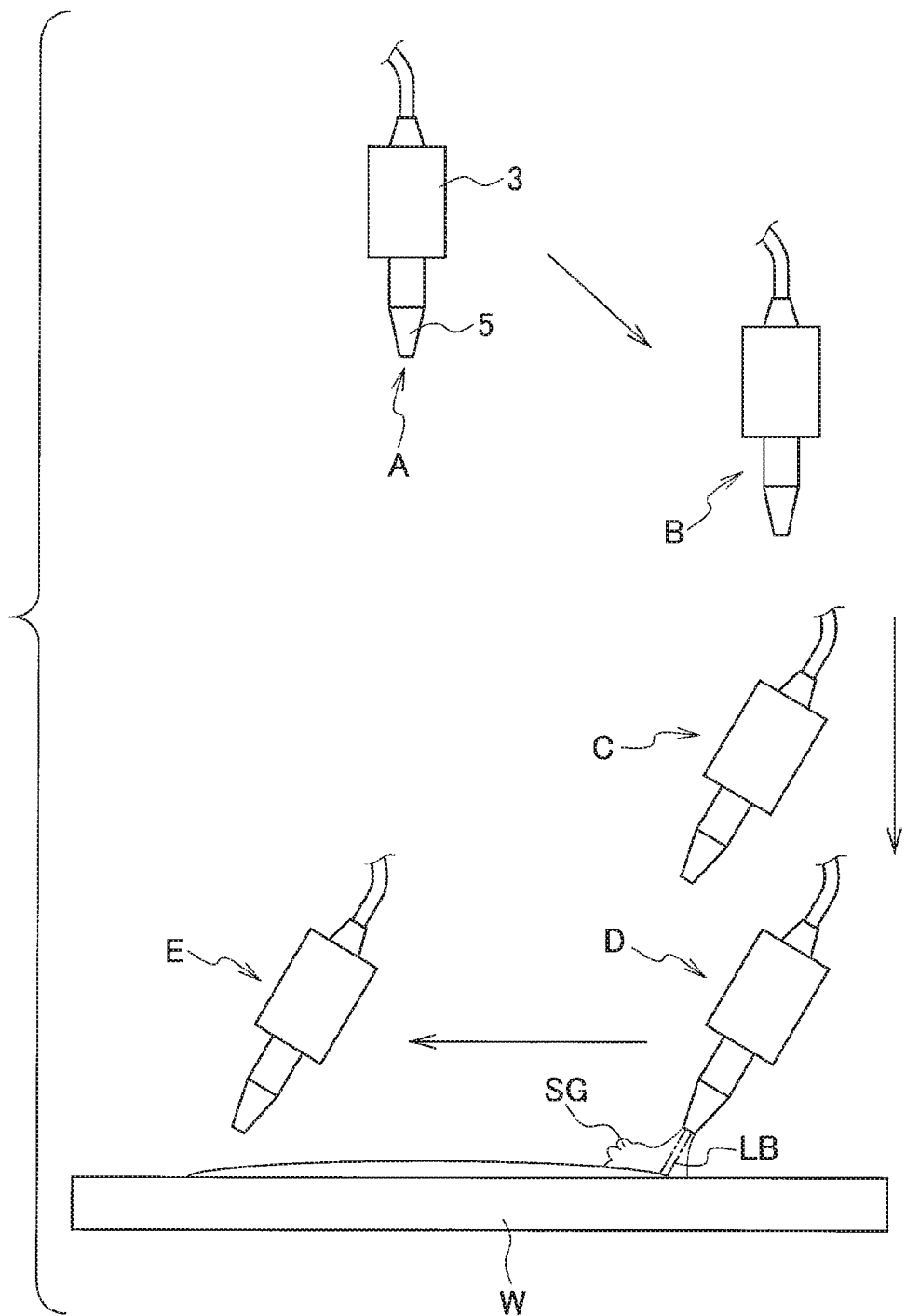
FIG. 2 is a schematic elevational view showing a trajectory where a laser processing head moves, along with gas emission.

In a case where laser welding is carried out on a workpiece W by means of the laser welding device 1, actions shown in FIG. 2 are to be done. More specifically, it starts moving from a stand-by position (reference position, start position) A of the laser processing head 3, goes through mid-course positions B, C on a predetermined travel path, and then reaches a starting position D for welding the workpiece W. Next, in a state where it stands still at the starting position D for welding, emission of shield gas SG starts and, after the gas feeding rate of the shield gas SG gets stabilized, the laser beam LB starts being radiated so as to start laser welding.

In the case as described above, the laser welding is to be carried out after the feeding rate of the shield gas SG is stabilized. Thus the laser welding can be well carried out and fine appearances of weld beads can be improved. The standby time required for stabilizing the feeding rate of the shield gas is nevertheless long, and therefore further improvement is desired in order to gain further efficiency of the laser welding.

Figure 3:
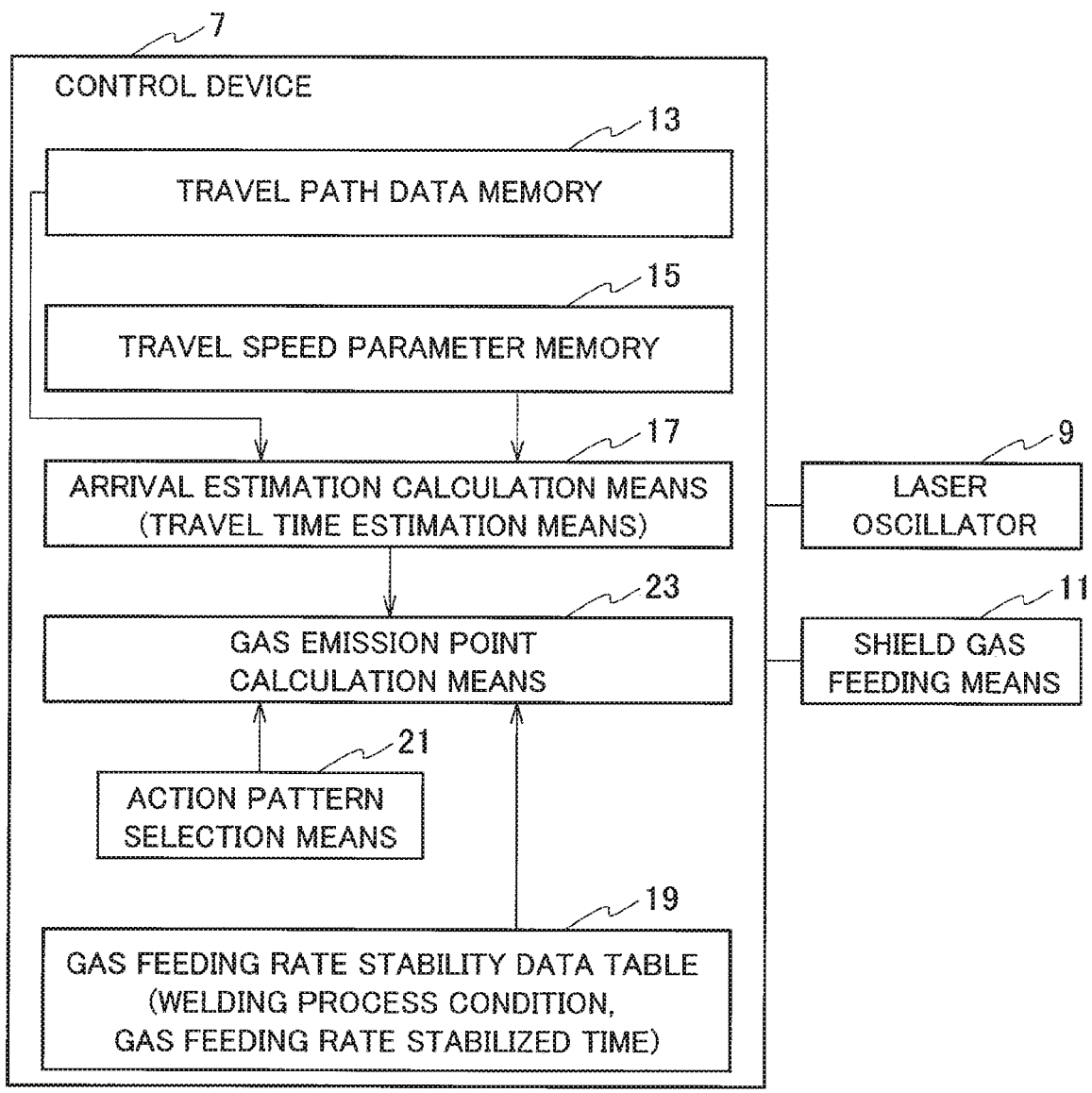
FIG. 3 is a block diagram of a control device for controlling action of the laser welding device.

Thus a control device 7 for controlling action of the laser welding device 1 is constituted in a way as illustrated in FIG. 3. Specifically, the control device 7 is constituted of a computer, with which a laser oscillator 9 for radiating a laser beam LB emitted through the laser nozzle 5 is connected and, as well, a shield gas feeding means 11 for feeding the laser nozzle 5 with shield gas SG emitted through the laser nozzle 5 is connected.

The control device 7 is provided with a travel path data memory 13. The travel path data memory 13 stores data about the travel path from the start position A for various sets of laser welding to the starting position D for welding the workpiece W. Further, it stores distance data and speed data of plural sections of various travel paths, such as distance data between positions A-B, between positions B-C and between C-D, and speed data.

Further, the control device 7 is provided with a travel speed parameter memory 15. This travel speed parameter memory 15 stores data of speeds as parameters corresponding to respective sections in the various travel paths.

Further, the control device 7 is provided with arrival estimation calculation means (travel time calculation means) 17 for calculating a time from starting at the start position A until reaching the starting position D for welding. This arrival estimation calculation means 17 is configured to refer the travel path data stored in the travel path data memory 13 and the travel speed data stored in the travel speed parameter memory 15 to calculate a travel time from starting at the start position A until reaching the starting position D for welding.

Figure 4:
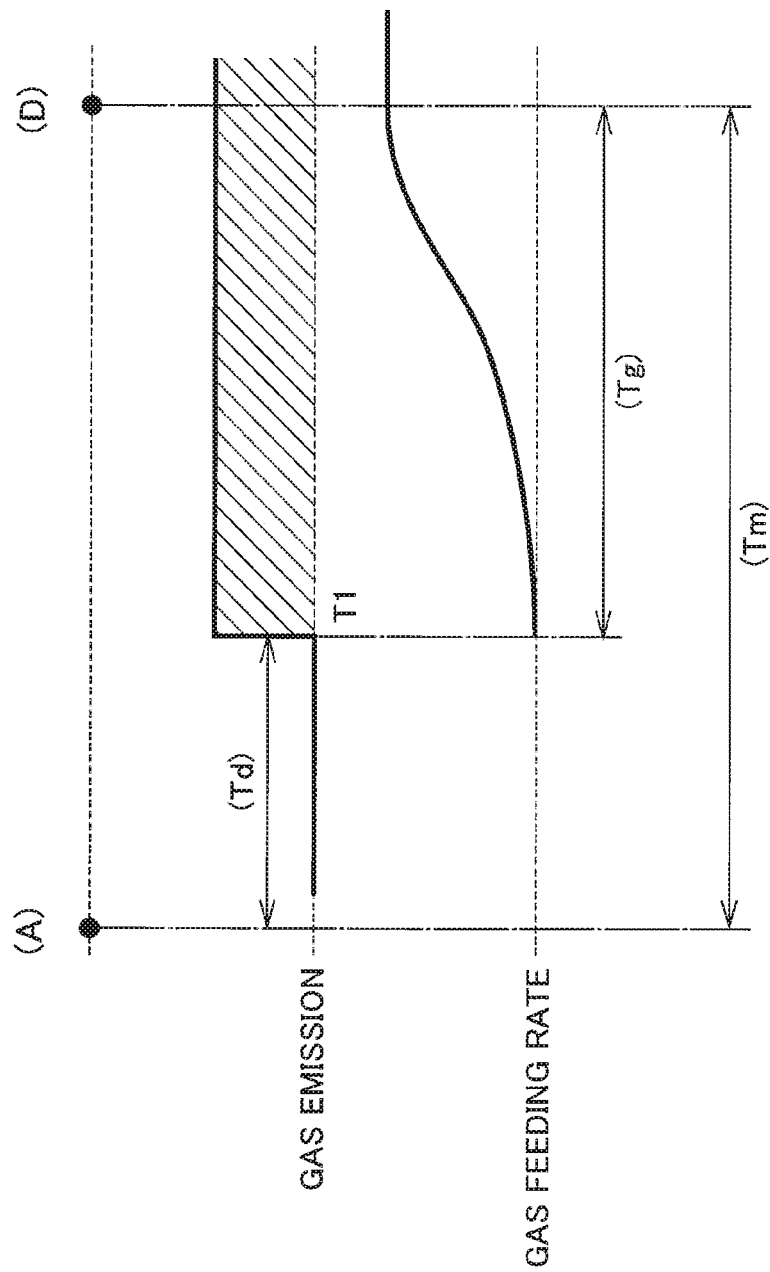
FIG. 4 is a graph schematically illustrating a relation between start of the gas emission and a time change of a feeding rate of the gas in the course where the laser processing head starts from an initial position and reaches a starting position for welding.

The control device 7 is provided with a gas feeding rate stability data table 19. This gas feeding rate stability data table 19 stores data about stabilizing times required for stabilizing feeding rates from after starting feeding assist gas from the shield gas feeding means 11 to the laser nozzle 5 until the feeding rates get stabilized. In regard to the stabilizing times, values corresponding to respective kinds of laser nozzles and respective kinds of shield gas in various welding processing conditions are stored therein. Specifically, as shown in FIG. 4, times Tg after starting emitting the shield gas through the laser nozzle 5 at an emission instruction time T1 for the shield gas until the gas feeding rates get stabilized are stored in the gas feeding rate data table 19 as corresponding to various welding processing conditions, kinds of laser nozzles and kinds of shield gas.

Further, the control device 7 is provided with an action pattern selection means (welding pattern selection means) 21. This action pattern selection means 21 is configured so that an operator can select and input therein one from a plurality of patterns as to welding patterns. For example, as the welding patterns, two patterns of a first pattern where a fine appearance of the weld bead or such weighs more and a second pattern where efficiency of the laser welding weighs more can be prepared. This action pattern selection means 21 may be snap switches connected to the control device 7 for example. Specifically, the action pattern selection means 21 is configured so that an operator when carrying out the laser welding can select and input therein the first pattern or the second pattern. Therefore it is possible to write selection of the first or second pattern in a processing program to carry out the laser welding.

In addition, the control device 7 is provided with a gas emission point calculation means 23. This gas emission point calculation means 23 is configured so as to calculate a time Td after the laser processing head 3 starts moving from the start position A until emitting the gas is started (see FIG. 4). Specifically, the gas emission point calculation means 23 is so configured as to refer an estimated arrival time Tm calculated by the arrival time estimation calculation means 17 and a gas feeding rate stabilization time Tg stored in the gas feeding rate stability data table 19 to calculate an emission start time Td after starting moving the laser processing head 3 from the start position A until emitting the gas is started. In other words, the gas emission point calculation means 23 is so configured as to calculate (emission start time Td=estimated arrival time Tm−gas feeding rate stabilization time Tg).

Figure 5:
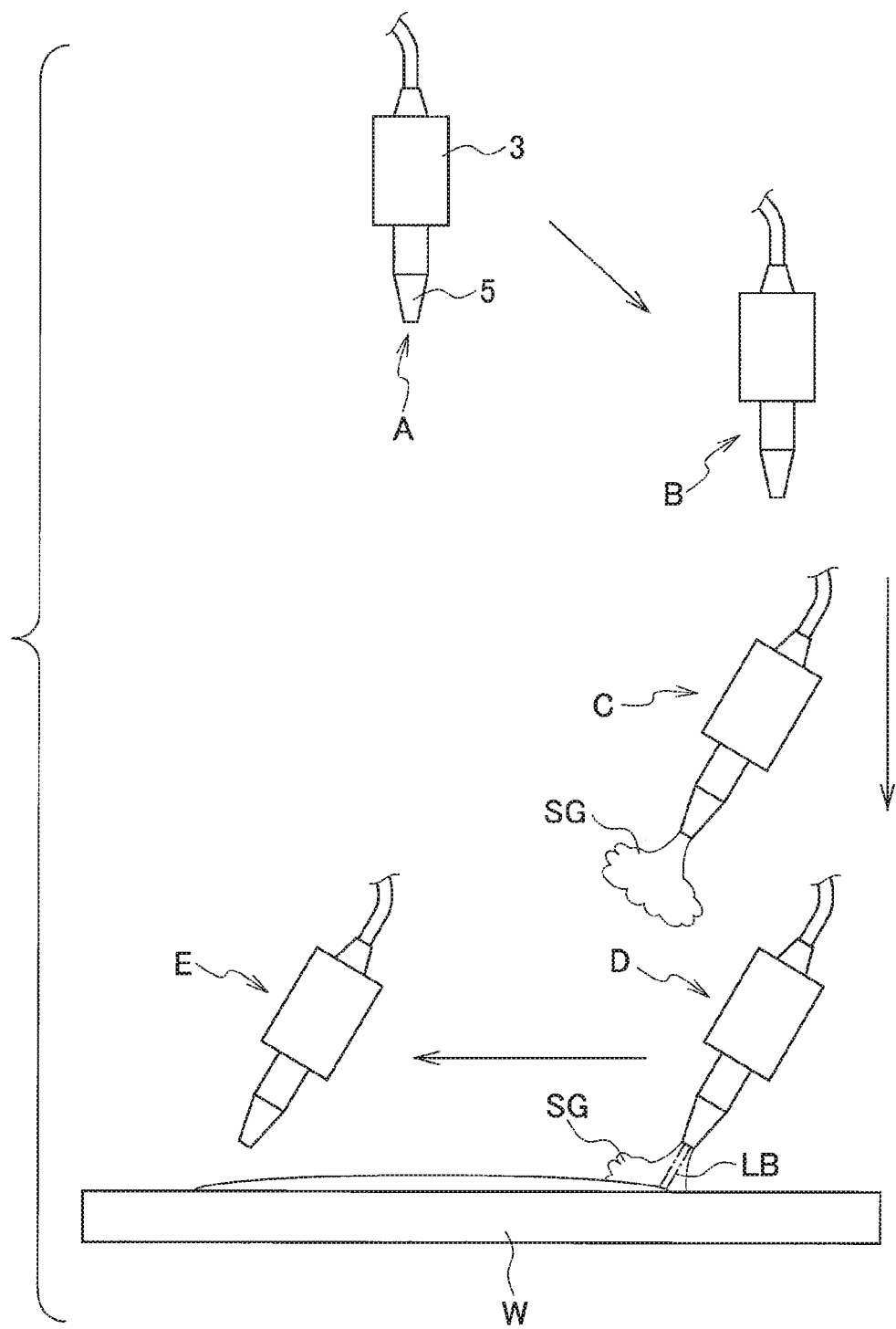
FIG. 5 is a schematic elevational view showing a trajectory where a laser processing head moves, along with gas emission according to another example.

Therefore, as schematically illustrated in FIG. 5, if the laser processing head 3 starts moving from the start position A and, at a proper position (at a mid-course position C, for example) before reaching the starting position D for welding, emission of the shield gas SG is started, the gas feeding rate of the shield gas will be stabilized as soon as the laser processing head 3 reaches the starting position D for welding. Thus, as soon as the laser processing head 3 reaches the starting position D for welding, radiation of the laser beam LB onto the workpiece W can be started to start the laser welding. Specifically, efficiency of the laser welding can be improved.

As being already understood from the above descriptions, if the second pattern is selected by means of the action pattern selection means 21, as described already, at a mid-course position on the way of the laser processing head 3 departing from the start position A but before reaching the starting position D for welding, specifically at the position C for example, emission of the shield gas SG is started. Next, as soon as the laser processing head 3 reaches the starting position D for welding, the gas feeding rate of the shield gas SG is stabilized. Thus, as soon as the laser processing head 3 reaches the starting position D for welding, radiation of the laser beam LB onto the workpiece W can be enabled so as to start the laser welding. Specifically, efficiency of the laser welding can be improved.

In the meantime, also in this second pattern, at a time when the laser processing head 3 reaches the starting position D for welding, the gas feeding rate of the shield gas SG has been stabilized. Therefore the fine appearance of the weld bead or such is improved. Specifically, both the efficiency and the fine appearance can be improved.

If the first pattern is selected by means of the action pattern selection means 21, the laser processing head 3 is so configured as to act as described with reference to FIG. 2, thereby improving the fine appearance of the weld bead or such.

In regard to a timing when the gas feeding rate of the shield gas SG gets stabilized, however, it is desired to make it simultaneous with a timing when the laser nozzle 5 reaches the starting position D for welding. It could be nevertheless configured so that the gas feeding rate gets stabilized where the laser nozzle 5 reaches a point at a predetermined distance from the starting position D for welding. Further, it is possible that the gas feeding rate gets stabilized after a predetermined time elapsed after the laser nozzle 5 reaches the starting position D for welding.

Although certain exemplary embodiments are described above, modifications and variations of the embodiments will occur to those skilled in the art, in light of the above teachings.

INDUSTRIAL APPLICABILITY

A laser welding device and a laser welding method that can suppress wasted consumption of the shield gas.

What is claimed is:

1. A laser welding method, comprising:

providing to a welding pattern selector a first welding pattern that causes an emission of shield gas through a laser nozzle provided on a laser processing head such that the shield gas is emitted at a mid-course position while moving the laser processing head along a travel path from a reference position to a starting position for welding the workpiece, the mid-course position being defined at a position intermediate the reference position and the starting position, the reference position being a stand-by position prior to moving the laser processing head along the travel path, the starting position for welding being a stand-still position at which the workpiece is welded, the first welding pattern causing an increase of the rate of the shield gas after starting the emission of the shield gas until the rate is stabilized, and, at the starting position for welding and when the rate of the shield gas is stabilized, starting radiating the laser beam onto the workpiece;

providing to the welding pattern selector a second welding pattern that causes a start of emission of the shield gas when the laser processing head reaches the starting position for welding and radiating the laser beam onto the workpiece when the rate of the shield gas is stabilized;

selecting and inputting a specific welding pattern into a welding pattern selector, the specific welding pattern being selected from among the first welding pattern and the second welding pattern; and performing laser welding on the workpiece according to the specific welding pattern that has been selected and inputted.

2. The laser welding method of claim 1, wherein, as caused by the second welding pattern, emission of the shield gas is started when the laser processing head reaches the starting position for welding, and emission of the shield gas is started at a time when the laser nozzle reaches the starting position for welding and then a feeding rate of the shield gas stabilizes.

3. The laser welding method of claim 1, wherein, as caused by the first welding pattern, emission of the shield gas is started when an elapsed time after the laser processing head starts moving from the reference position reaches a predetermined time, or when a travel distance along the travel path reaches a predetermined distance.

* * * * *